UNITED STATES PATENT OFFICE.

J. HORNIG AND L. SUESS, OF UNION HILL, NEW JERSEY.

IMPROVEMENT IN ARTIFICIAL STONE.

Specification forming part of Letters Patent No. 9,775, dated June 7, 1853.

*To all whom it may concern:*

Be it known that we, JULIUS HORNIG and LUDWIG SUESS, both of Union Hill, in the county of Hudson, the State of New Jersey, have invented a new and improved composition of certain ingredients intended to be used for plain architectural as well as ornamental purposes, to be called the "Columbia Stone;" and we do hereby declare that the following is a full and exact description thereof, reference being had to the accompanying specimens of composition and its ingredients, and to the letters of reference marked thereon.

Nature offers many kinds of material suitable for architectural purposes—viz., sandstone, marble, granite, basalts, &c.—and they are extensively used. There can be no doubt, however, that they would be in still greater demand if the prices for procuring and working them were not too high. We therefore determined to invent a composition suitable for the formation of stones, which should combine the valuable qualities of a good natural building material with greater cheapness in the production. To produce as faithful an imitation of natural sandstone as possible was our first aim. We therefore turned our attention next to the ingredients which compose that stone, and then to the manner in which nature united these ingredients to a compact mass. Quartz is the predominating element in all kinds of sandstone, its minute particles being united by a sort of cement of clay, lime, or quartz. Sandstone is considered by many as a product of precipitation, its ingredients having been previously dissolved in the waters. In our opinion several of the harder and more durable kinds of sandstone were produced by the action of heat. This view was supported by the half-fritted appearance of the harder kinds of this mineral when fresh broken, and by the remarkable circumstance that in certain mountainous regions (especially in the so-called "Trias") sandstone (new red sandstone) is found alongside with masses of minerals (of parget-stone, for instance) of doubtless a volcanic or plutonic origin. These and similar facts induced us to employ heat for the purpose of well uniting the ingredients of our composition. We selected quartz (silicic acid) and clay as principal ingredients of our composition. We preferred clay as cementing ingredient because its plastic quality facilitates the process of forming. How to find a third ingredient that under the influence of heat would bring about a chemical combination of the two above-mentioned materials was the next question. Now, it is a well-known fact that many minerals of volcanic origin (albite, labrador, lava, basalts, &c.) contain soda, (protoxide of sodium.) Among the different gases escaping from active volcanoes hydrochloric gas plays a very important part. In many mountainous regions in the immediate vicinity of minerals of volcanic origin mighty deposits of rock-salt are to be found, which are certainly not the result of precipitation from the waters of the sea, as is sufficiently demonstrated by the almost entire absence of corresponding petrifactions. These reasons and the circumstance that common salt (chloride of sodium) under different denominations is spread so extensively and in so large masses over the surface of the earth, and, further, the considerable quantity of sodium which salt contains, all these reasons brought us to the conclusion that in the formation of volcanic or plutonic products salt has played a very important part. We therefore chose salt as the means to effect, under the influence of heat, a chemical union between quartz and clay, (silicic acid and alumina,) its chlorine escaping as hydrochloric gas, and sodium as oxide uniting with the alumina, which now forms a chemical connection with the silicic acid. In this manner a product is obtained which is nearly related to certain species of feldspar or albite, and which, if carefully prepared, will answer all purposes of a fine building material. Therefore quartz, clay, and salt are the principal elements of our composition.

For coarse-grained sorts of stone, white sand, as is found extensively on the shores of the sea, will perfectly answer. Products of finer grain of course require a finer and purer quality of quartz. The quality of the stone depends, further, on the purity of the clay. Salt may be used as it is offered for sale. These ingredients are well mixed up, moistened with water, properly formed, thoroughly dried, and gradually exposed to the influence of heat. Having for some time been kept in a white, hot state, the firing is stopped and the stone left gradually to cool off. We found that the hardness of the composition is increased if mixed up with powdered particles of previously formed natural or artificial silicates, (basalts, glass, metallic dross, &c.) In a similar way the stones may be differently colored.

As to the proportions, we give below the usual proportions of the ingredients used to the various modifications of the artificial stone; but for a general rule of action we employ silex, ten to fourteen parts, pure alumina, one part, and a sufficient quantity of salt or substance containing sodium or potassium to convert a part of the silex into a cement for the remaining parts.

We generally found that a composition consisting of seventy units by weight of white sand, eighteen units of clay, and twelve units of salt may be considered and used as a fair sample of common white sandstone of an average hardness. We may consider the above proportions as a kind of basis, that if modified either by altering the proportions of ingredients or by the addition of small quantities of one or more other substances, as alluded to above, will appear more or less altered and improved in regard to hardness, durability, and color. We will give a few instances of such modifications.

The composition receives a fine white color by the addition of a small quantity of chalk. The proportions may be seventy units of sand, sixteen clay, twelve salt, two chalk. A quantity of powdered dross of copper will give a greenish color. A composition of sixty-five sand, fifteen clay, ten salt, and ten dross of copper will produce a satisfactory result.

Powdered dross of iron (if not too poor in metal) mixed up with the three principal ingredients increases the hardness of the stone very remarkably and gives it a fine gray or black color. A good composition of that kind would be sixty sand, fifteen clay, ten salt, and fifteen dross of iron.

To give the composition a very remarkable degree of hardness and a granite-like appearance, we found the following composition of advantage: sixty sand, fifteen clay, ten salt, fifteen quartz-slate.

If very fine powdered quartz is used instead of sand, the products will have a far greater hardness and beauty of appearance.

These qualities may be improved yet by the addition of small quantities of silicates, &c. A composition, for instance, of seventy pounds quartz, fifteen clay, ten salt, five powdered glass will in most respects be found very satisfactory. A composition of a delicate white color and great hardness is produced by combining sixty-five pounds quartz, fifteen clay, ten salt, five powdered glass, five chalk.

We might go on with the enumeration of modified compositions for a great length; but we hope the few above-described modes of obtaining products more or less differing from each other will sufficiently show that our composition, properly modified and managed, can be made to possess any color or other important quality that may be demanded of a natural building-stone.

We do not claim the use of a salt for forming a glaze upon pottery wares; but

What we claim as our invention, and desire to secure by Letters Patent, is—

The mode or process of forming artificial stone as described—that is to say, the employment of silex, alumina, and salt, mixed and treated substantially in the manner set forth and in the proportions designated, in the manufacture of artificial stone, meaning by "salt" the chloride of sodium or its equivalent, as set forth in the specification.

JULIUS HORNIG.
LUDWIG SUESS.

Witnesses:
LOUIS KAUFMANN,
LUDWIG EDUARD HERRMANN.